Figure 1:
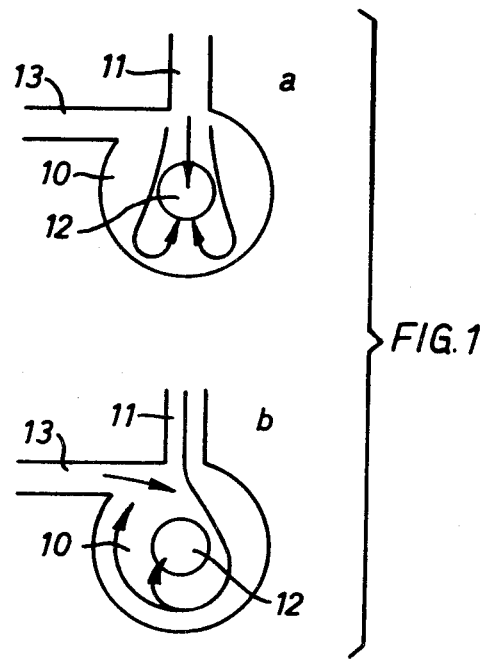

United States Patent

[11] 3,592,213

| [72] | Inventor | Charles Philip Smith |
| | | Wolverhampton, England |
| [21] | Appl. No. | 875,933 |
| [22] | Filed | Nov. 12, 1969 |
| [45] | Patented | July 13, 1971 |
| [73] | Assignee | H. M. Hobson Limited |
| | | London, England |
| [32] | Priority | Nov. 12, 1968 |
| [33] | | Great Britain |
| [31] | | 53,596/68 |

[54] FUEL FLOW PROPORTIONER
5 Claims, 6 Drawing Figs.

[52] U.S. Cl. ................................. 137/98, 137/81.5
[51] Int. Cl. .................................. G05d 11/00
[50] Field of Search ....................... 137/81.5, 100, 98

[56] References Cited
UNITED STATES PATENTS

| 3,033,277 | 5/1962 | Cowles et al. | 137/100 X |
| 3,220,429 | 11/1965 | Tatsuno | 137/100 |
| 3,383,038 | 5/1968 | Boothe | 137/81.5 X |
| 3,392,739 | 7/1968 | Toplin et al. | 137/81.5 X |
| 3,410,291 | 11/1968 | Boothe et al. | 137/81.5 |
| 3,426,534 | 2/1969 | Murphy | 137/81.5 X |
| 3,489,009 | 1/1970 | Rimmer | 137/81.5 X |
| 3,493,005 | 2/1970 | Kakegama | 137/100 |
| 3,508,565 | 4/1970 | Strantz | 137/81.5 |
| 3,515,158 | 6/1970 | Utz | 137/81.5 |

*Primary Examiner*—Samuel Scott
*Attorney*—E. T. Le Gates

ABSTRACT: The invention provides a fuel flow proportioner for aircraft which comprises two fluidic vortex valves, one interposed in the flow line from one fuel tank and the other interposed in the flow line from another fuel tank, and mechanism for sensing the fuel pressures at the outlets of the two vortex valves and operative, in the event of these outlet pressures becoming unbalanced due to excess flow in one of the flow lines, to increase the control flow supplied to the vortex valve in the line having the higher outlet pressure.

FUEL FLOW PROPORTIONER

This invention is concerned with a fuel flow proportioner for use in aircraft for the purpose of ensuring proportional flow of fuel from different fuel tanks to the engine and therefore maintenance of the center of gravity of the fuel load in a constant position. In a typical instance in which fuel is drawn from two tanks of equal capacity, one in each wing, the task of the fuel flow proportioner is to ensure equal rates of flow of fuel in the lines leading from the tanks to the engine. In a case, however, when the capacity of one tank is $n$ times that of the other, the proportioner is intended to ensure that the rate of flow of fuel from the larger tank will be $n$ times that from the smaller tank.

The invention provides a fuel flow proportioner in which the control is effected by devices in the flow lines having no moving parts, namely fluidic vortex valves.

The expression "fluidic vortex valve" as used herein means a flat disclike cylindrical chamber having a supply inlet providing for a radial flow of supply fluid into the chamber, an outlet providing for axial flow of fluid out of the chamber and a control inlet providing for tangential flow of control fluid into the chamber. Such a valve can be used both with gaseous and liquid fluids and has the characteristic that, when fluid is supplied to the control inlet at a certain control pressure greater than the pressure of admission to the supply inlet vortex flow will be established in the chamber with the result that the pressure drop between the supply inlet and the outlet is greatly increased for the same flow throughout.

The valve may have a plurality of supply and control inlets and a pair of outlets one at each end of the chamber. The supply flow may be provided by one or more radial holes in the peripheral wall of the chamber or by providing the chamber with porous peripheral wall. Alternatively the supply inlet may be in an end wall of the chamber and communicate with an annulus within the chamber.

Figure 2:
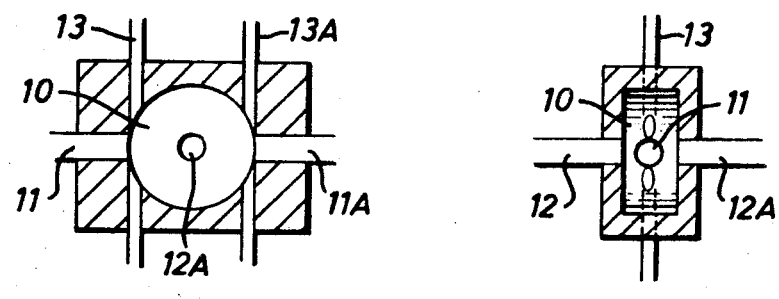
Figure 3:
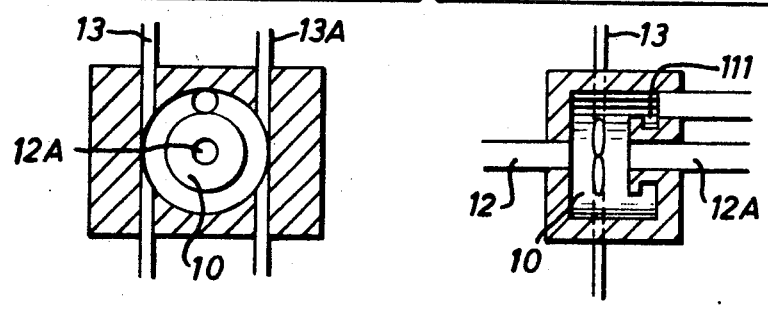

Typical examples of fluidic vortex valves are illustrated in FIGS. 1—3 of the accompanying drawings.

FIG. 1, which is purely diagrammatic, shows a valve having a chamber 10, a radial supply inlet 11, an axial outlet 12 and a tangential control inlet 13. The flow in the absence of control flow is indicated by the arrows in the upper sketch ($a$) of FIG. 1 and the flow under conditions of positive control flow is indicated by the arrows in the lower sketch ($b$).

FIG. 2 shows in mutually perpendicular cross-sectional views, a valve having a chamber 10, two alternative radial supply inlets 11, 11A, two alternative axial outlets 12, 12A and two alternative tangential control inlets 13, 13A.

FIG. 3 shows, in similar fashion to FIG. 2, another form of valve having a single annular supply inlet III.

In a typical case the diameter of the chamber may be 0.6 inches, its depth 0.1—0.3 inches, the diameter of each supply inlet may be 0.139 inches, the diameter of each control inlet may be 0.1 inches, and the diameter of each outlet may be 0.196 inches.

A fluid vortex valve is analogous to an electronic vacuum triode since a small control flow can be utilized to control a large supply flow and the vortex flow can be controlled by modification of the control pressure. The vortex flow can also be controlled by modifying the back pressure at the outlet since such modification will vary the pressure at the supply inlet and therefore the relation between the supply pressure and the control pressure.

The fuel flow proportioner according to the invention comprises two fluidic vortex valves, one interposed in the flow line from one fuel tank and the other interposed in the flow line from another fuel tank, and mechanism for sensing the fuel pressures at the outlets of the two vortex valves and operative, in the event of these outlet pressures becoming unbalanced due to excess flow in one of the flow lines, to increase the control flow supplied to the vortex valve in the line having the higher outlet pressure.

In one embodiment of the invention the outlet pressures are applied to opposite sides of a diaphragm or other pressure-sensitive device connected to control valve which controls the control pressures applied to the vortex valves. In another construction the sensing of the outlet pressures and the control of the vortex valves is effected by a pair of proportional fluid amplifiers of the kind described in our U.S. Pat. application Ser. No. 735,281.

Figure 4:
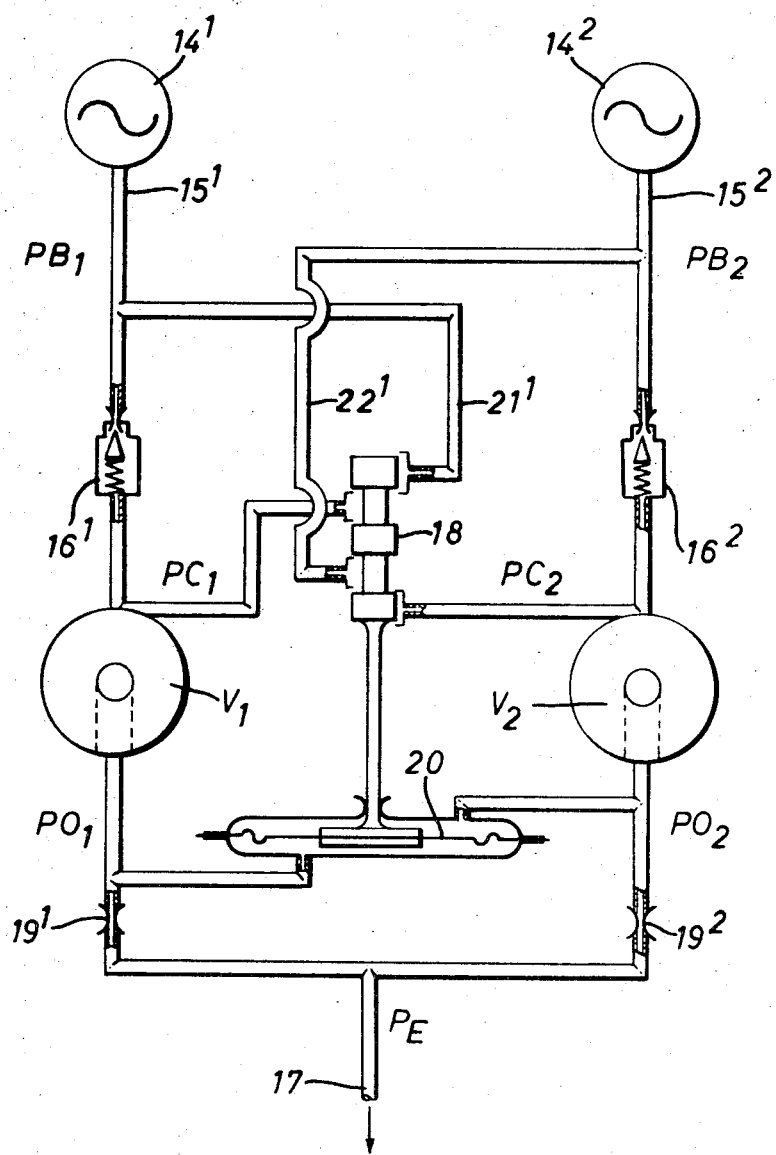
Figure 5:
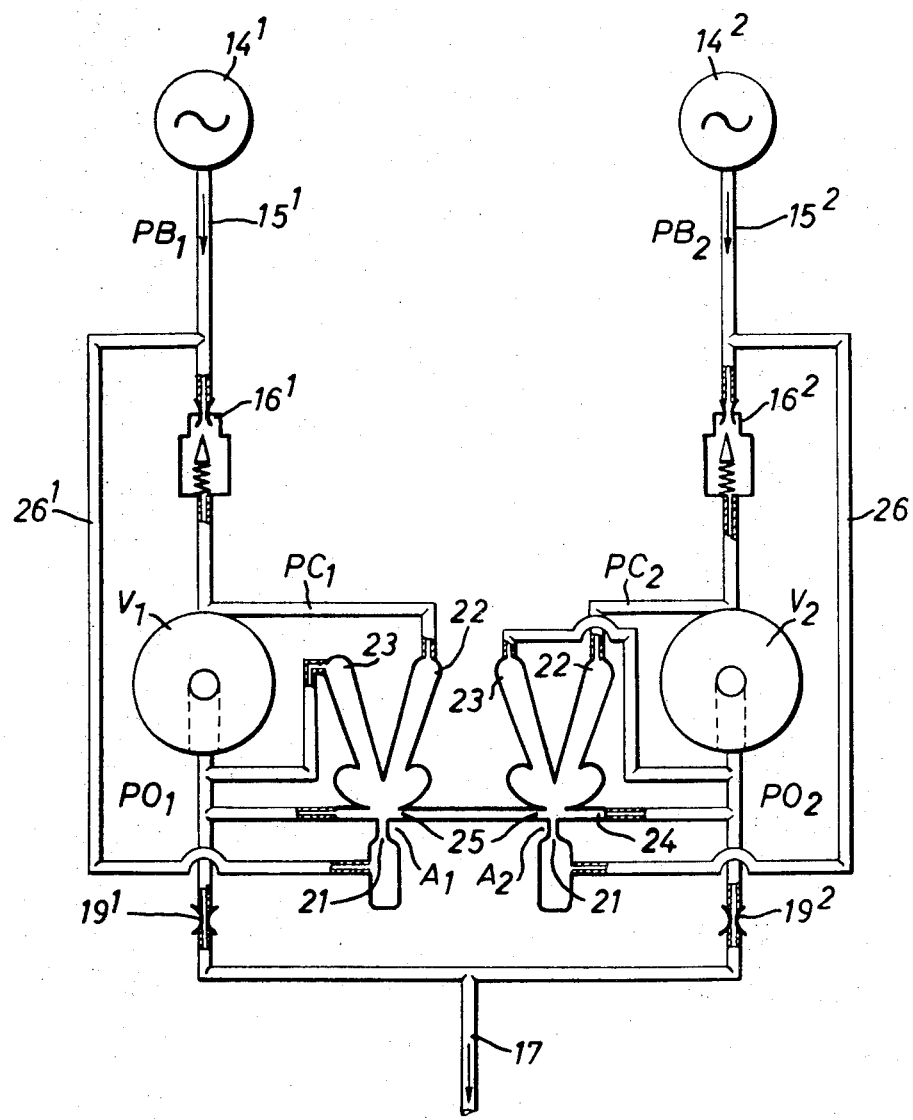
Figure 6:
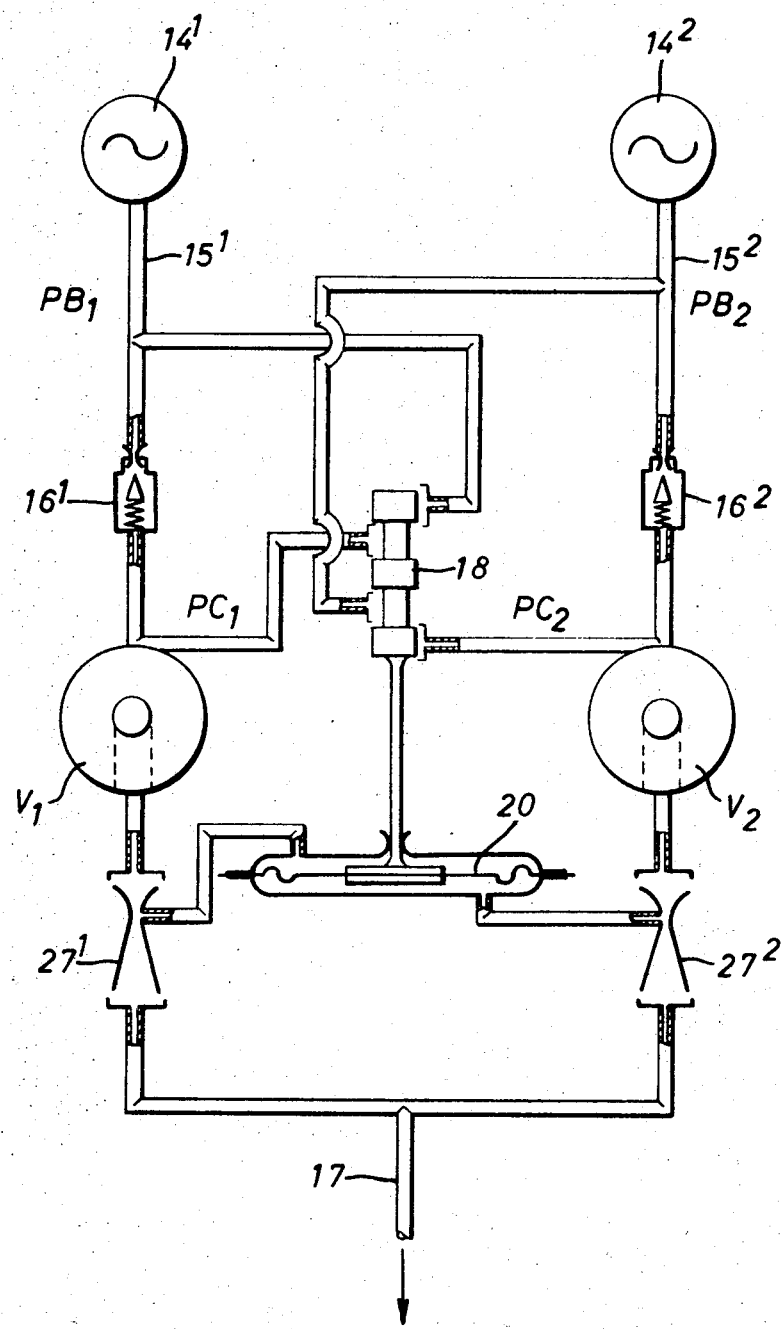

Three alternative forms of fuel flow proportioner according to the invention are illustrated, by way of example, in FIGS. 4, 5 and 6 respectively of the accompanying drawings.

Like reference numerals designate like parts in these figures.

In the construction shown in FIG. 4, fuel is fed from the two tanks (not shown) by booster pumps $14^1$, $14^2$ along separate flow lines, $15^1$, $15^2$ containing vortex valves $V_1$, $V_2$ respectively and leading to a common outlet line 17 to the engine. Nonreturn valves $16^1$, $16^2$ in the lines $15^1$, $15^2$ operate to restrict the entry pressures of the fuel to the vortex valves $V_1$, $V_2$ to values $PS_1$ and $PS_2$ below the pump delivery pressures $PB_1$ and $PB_2$ and below the control pressures $PC_1$ and $PC_2$ which can be admitted to the vortex valves upon opening of a control valve 18. Restrictors $19^1$, $19^2$ downstream of the vortex valves control the outlet pressures $PO_1$ and $PO_2$ from the vortex valves. When equal flows are required in the two lines the restrictors $19^1$ and $19^2$ are of the same diameter but restrictors of appropriate different diameters are used when the rates of flow in the two lines are to be maintained at a ratio other than unity. The outlet pressures $PO_1$ and $PO_2$ are applied to opposite sides of a diaphragm 20 connected to the control valve 18.

When the flows in the two lines are equal, the control valve 18 is maintained in a neutral position in which it closes lines $21^1$ and $21^2$ which supply control pressure to the vortex valves. If, however, the flow through the valve $V_1$ should increase with respect to that through the valve $v_2$, the resultant increase in the outlet pressure $PO_1$ will cause the diaphragm 20 to lift the valve 18, so applying control pressure $PC_1$ to the valve $V_1$ and, as the result of the resulting vortex action in the valve $V_1$, restricting the flow in the line $15^1$ passing through the valve $V_1$ to reestablish equality of flow in the two flow lines $15^1$, $15^2$. Obviously an increase in the outlet pressure $PO_2$ will cause the valve 18 to move in the reverse direction to apply control pressure $PC_2$ to the valve $V_2$ and so reduce the flow through the valve $V_2$.

If desired, the setting of the valve 10 may be such that a control flow is normally provided to both valves $V_1$, $V_2$. In this case movement of the valve 10 in response to a discrepancy in output pressures will increase the control flow to one vortex valve and decrease the control flow to the other.

In the arrangement shown in FIG. 5 the mechanism for controlling the vortex valves $V_1$, $V_2$ involves no moving parts, the diaphragm and control valve of FIG. 4 being replaced by two proportional fluid amplifiers $A_1$ and $A_2$. Each of the amplifiers $A_1$, $A_2$ has an inlet 21, two limbs 22, 23 and two control ports 24, 25; the control ports of the two amplifiers being interconnected as shown. The inlets 21 of the amplifiers $A_1$, $A_2$ are connected respectively by lines $26^1$, $26^2$ to the lines $15^1$, $15^2$ at points upstream of the vortex valves $V_1$, $V_2$ and are therefore provided with fuel at input pressures $PB_1$, $PB_2$. The fuel entering each amplifier is split into two jets, one in each limb of the amplifier. The fuel in the limbs 22 provides control pressure $PC_1$, $PC_2$ for the vortex valves $V_1$ and $V_2$ and the fuel in the limbs 23 returns to the outlets of the vortex valves $V_1$, $V_2$. The output pressures $PO_1$ and $PO_2$ of the vortex valves are applied as control pressures to the ports 24 of the amplifiers $A_1$ and $A_2$ and control the distribution of fuel between the jets in the limbs 22, 23 of the amplifiers. The system remains in equilibrium so long as the rate of flow of fuel in the lines $15^1$, $15^2$ is equal. Under these conditions, $PB_1$ and $PB_2$, $PO_1$ and $PO_2$ and $PC_1$ and $PC_2$ are equal.

If the output pressure $PO_1$ should increase, the jet distribution in the amplifier $A_1$ will be changed to increase the control pressure $PC_1$ and the jet distribution in the amplifier $A_2$ will be changed to reduce the control pressure $PC_2$, this causing the vortex valves $V_1$, $V_2$ to react to return the pressures $PO_1$ and $PO_2$ to equality. The reverse action takes place in the event of increase in the output pressure $PO_2$.

Nonreturn valves (not shown) may be provided in the supply lines to the amplifiers $A_1$, $A_2$.

As an alternative, the restrictors $19^1$, $19^2$ of FIGS. 4 and 5 may be replaced by venturis $27^1$, $27^2$ as shown in FIG. 6 for the case of FIG. 4, the pressures sensed by the diaphragm 20 (FIG. 4) or the fluid amplifiers $A_1$, $A_2$ (FIG. 5) being derived from the throats of the venturis $27^1$, $27^2$. Such venturis provide a greater error signal than measuring orifices so enabling the size of the diaphragm to be reduced or, alternatively, a reduction in the overall pressure drop in fuel lines required to obtain a given accuracy.

It will be noted from FIG. 6 that the use of venturis necessitates a reversal of the connections to the error-sensing mechanism, i.e. the diaphragm or the fluid amplifiers as the case may be.

The proportioners described above can, of course, be elaborated to proportion the fuel flow in more than two flow lines.

What I claim as my invention and desire to secure by Letters Patent is:

1. A fuel flow proportioner for aircraft which comprises two fluidic vortex valves, one interposed in the flow line from one fuel tank and the other interposed in the flow line from another fuel tank, and mechanism for sensing the fuel pressures at the outlets of the two vortex valves and operative, in the event of these outlet pressures becoming unbalanced due to excess flow in one of the flow lines, to increase the control flow supplied to the vortex valve in the line having the higher outlet pressure.

2. A fuel flow proportioner as claimed in claim 1, in which the sensing mechanism comprises a pressure-sensitive device exposed at opposite sides to the outlet pressures of the vortex valves and a control valve connected to the pressure-sensitive device and controlling the control pressures applied to the vortex valves.

3. A fuel flow proportioner as claimed in claim 1, in which the sensing mechanism comprises a pair of interconnected proportional fluid amplifiers, each associated with one of the flow lines and having an inlet connected to that flow line upstream of the vortex valve therein, a control port connected to that flow line downstream of the vortex valve and an outlet providing control pressure for the vortex valve.

4. A fuel flow proportioner as claimed in claim 1, in which the outlet pressure applied to the sensing mechanism are derived from points in the flow lines between the outlets of the vortex valves and restrictors in the flow lines.

5. A fuel flow proportioner as claimed in claim 1, in which the outlet pressures applied to the sensing mechanism are derived from the throats of venturis in the flow lines which are situated downstream of the vortex valves.